United States Patent [19]

Hayes et al.

[11] Patent Number: 5,055,190

[45] Date of Patent: Oct. 8, 1991

[54] HIGH VOLUME PERMANENT MAGNET FILTER

[75] Inventors: James K. Hayes, Chattanooga, Tenn.; James W. Larsen, Douglasville, Ga.

[73] Assignee: Combustion Engineering, Inc., Windsor, Conn.

[21] Appl. No.: 337,355

[22] Filed: Apr. 13, 1989

[51] Int. Cl.[5] .............................................. B01D 35/06

[52] U.S. Cl. .................................... 210/222; 210/223; 55/100; 209/224

[58] Field of Search ..................... 210/222, 223, 416.1; 209/223.1, 223.2, 232, 224; 55/100; 165/119; 376/315

[56] References Cited

U.S. PATENT DOCUMENTS

| | | | |
|---|---|---|---|
| 2,652,925 | 9/1953 | Vermeiren | 209/224 |
| 3,841,486 | 10/1974 | Heitmann et al. | 210/222 |
| 4,116,829 | 9/1978 | Clark et al. | 210/222 |
| 4,367,143 | 1/1983 | Carpenter | 210/222 |
| 4,569,758 | 2/1986 | Sandulyak et al. | 55/100 |
| 4,883,591 | 11/1989 | Belasco | 210/223 |

FOREIGN PATENT DOCUMENTS

| | | | |
|---|---|---|---|
| 617375 | 7/1978 | U.S.S.R. | 210/222 |
| 949159 | 2/1964 | United Kingdom | 210/223 |

*Primary Examiner*—W. Gary Jones
*Assistant Examiner*—Matthew O. Savage
*Attorney, Agent, or Firm*—Chilton, Alix & Van Kirk

[57] ABSTRACT

The magnet filter (10,100) has a frame for supporting a plurality of elongated, non-magnetic tubes (20, 108) in a regular, spaced-apart array. A plurality of magnetic bodies (38,112), which can take a variety of forms, are situated in the spaces between the tubes of the array, for imposing a magnetic field within each tube over substantially the full length of each tube. The upstream end of each tube is adapted for receiving a fluid to be magnetically filtered and the downstream end is adapted for discharging such fluid. As the fluid passes through each tube, the magnetic field imparts a force to the magnetizable particulates, which are drawn toward the magnetized internal structure within the tube where they are deposited, thus filtering the fluid. The magnetic bodies may produce a field that is oriented either substantially parallel to the tube, or transverse to the tube. The latter arrangement is particularly effective when used in conjunction with a plurality of magnetizable bars (112) supported in spaced-apart relation within each tube to provide an increased surface for particulate deposition within the tube.

23 Claims, 8 Drawing Sheets

HIGH VOLUME PERMANENT MAGNET FILTER

BACKGROUND OF THE INVENTION

The present invention relates to filters, and more particularly, to permanent magnet filters of the type used to remove corrosion products from flow lines in power plants and other industrial processes.

Although corrosion is of concern in most industrial processes, such concern is magnified in fluid processes involving highly toxic or radioactive materials, such as nuclear power plants. Corrosion products enter a nuclear steam generator through the feed train and are also developed within the steam generator itself. The steam exiting the steam generator contains little or no corrosion products. The nuclear steam generator therefore collects a large portion of the corrosion products produced in the system.

These corrosion products circulate within the fluid of the steam generator until they are eventually deposited on a metal surface inside the generator. The largest portion of the corrosion products eventually deposit on the tube sheet which is the lowest location within the generator. Corrosion products in the form of sludge, have accumulated to a thickness of up to 12 inches in some operating steam generators. This sludge layer reduces the heat transfer area of the steam generator and thus adversely effects the efficiency of the unit. Also, the sludge corrosively attacks the tubes and results in leakage of the radioactive primary fluid from the reactor to the steam generator.

Continuous blow-down procedures are employed in most steam generators in an attempt to reduce the concentration of corrosion products circulating within the steam generator. Also, systems are being developed whereby a portion of the fluid within the steam generator is removed, cooled and circulated through an external magnetic filter. The fluid is then returned to the system. One such technique is described in co-pending U.S. patent application Ser. No. 020,324, filed Feb. 27, 1987. Although the techniques described in that patent application represent a significant improvement over prior magnet filter techniques, further improvement would be desirable, in terms of cost-effectively increasing the intensity, and thus the filtering power of the magnetic fields.

SUMMARY OF THE INVENTION

It is thus an object of the present invention to provide a permanent magnet filter having an improved arrangement of magnets and tubes, for extracting magnetizable corrosion products flowing through a filtering vessel.

It is a more particular object to increase the magnetic fields imposed on a plurality of flow tubes through which a process fluid is transported, such that the extraction of magnetizable material from the fluid in the tube to adhere to the tube wall or associated structure, is increased relative to known techniques.

In a generalized embodiment of the invention, the magnet filter has a frame for supporting a plurality of elongated, non-magnetic tubes in a regular, spaced-apart array. A plurality of magnetic bodies, which can take a variety of forms, are situated in the spaces between the tubes of the array, for imposing a magnetic field within each tube over substantially the full length of each tube. The upstream end of each tube is adapted for receiving a fluid to be magnetically filtered and the downstream end is adapted for discharging such fluid.

As the fluid passes through each tube, the magnetic field imparts a force to the magnetizable particulates, which are drawn toward the magnetized internal structure within the tube where they are deposited, thus filtering the fluid. The magnetic bodies may produce a field that is oriented either substantially parallel to the tube, or transverse to the tube. The latter arrangement is particularly effective when used in conjunction with a plurality of magnetizable bars supported in spaced-apart relation within each tube to provide an increased surface for particulate deposition within the tube.

In one embodiment of the invention, a closed vessel has a fluid inlet at one end and a fluid outlet at the other end. A plurality of non-magnetic metal tubes of substantially the same length are located within the vessel and extend in spaced-apart parallel relation from adjacent the inlet to adjacent the outlet. The tubes are supported in a stationary position within the vessel. Fluid is directed from the inlet, through the tubes, and to the outlet. A plurality of magnet plates and pole plates are located transversely to the tubes such that all the tubes pass through all the plates. The magnet plates and pole plates are alternated over substantially the full length of the tubes. Each pole plate is formed from a material having a high susceptibility to magnetization. Each magnet plate has a north pole side and a south pole side, with the magnet plates oriented so that substantially each pole plate is sandwiched between two magnet plate sides of the same polarity. This produces an intense magnetic field within each tube such that magnetizable particles in the fluid adhere to the inside surface of each tube.

In another embodiment of the invention, a substantially closed vessel has a fluid inlet and a fluid outlet. A plurality of non-magnetic, metal tubes are supported within the vessel in an ordered array having a recurring sequence of spaces between recurring groups of tubes. Preferably, the tubes are arranged in rows and columns, such that, for example, each row represents a group of tubes, and a recurring sequence of spaces is provided between the rows of tubes. A plurality of permanent magnets are supported in the recurring spaces between the groups of tubes, creating an intense magnetic field through each tube, transverse to the direction of flow. A plurality of magnetic metal bars are supported in spaced-apart relation within each tube. Fluid to be filtered in then directed from the inlet, into and through the plurality of tubes, and then to the vessel outlet. Preferably, the closed vessel is formed as an elongated, rectangular box by joining together four rectangular housing plates. With the tubes in an array of rows and columns, the permanent magnets are preferably in the form of elongated plates located between either the rows or columns of the array and in contact with the tubes in the respective adjacent rows or columns, and the end magnets being in contact with opposed housing plates.

The invention described and claimed herein is well adapted for skid mounting as side stream permanent magnet filters for nuclear power plants. The invention is also suitable for use in full flow filters as well. Removal efficiencies exceeding 90% are achievable under many nuclear plant operating environments.

In normal operation, the desired fluid flow velocity is in the range of about two to five feet per second. When it is desired to remove the corrosion products, such as during an outage, a dedicated auxiliary piping system directs water through the tubes at a velocity three to four times that utilized in normal operation. The corrosion products are thus stripped from the tubes and deposited in the auxiliary system filter. This cleaning flow is required for only about three to five minutes per tube to remove all corrosion products.

The configurations of the present invention provide a theoretical increase in magnetic forces within the effective filtering volumes, of at least 7.8 times those available with the arrangement described in the patent application mentioned above.

DESCRIPTION OF THE PREFERRED EMBODIMENT

Figure 1:
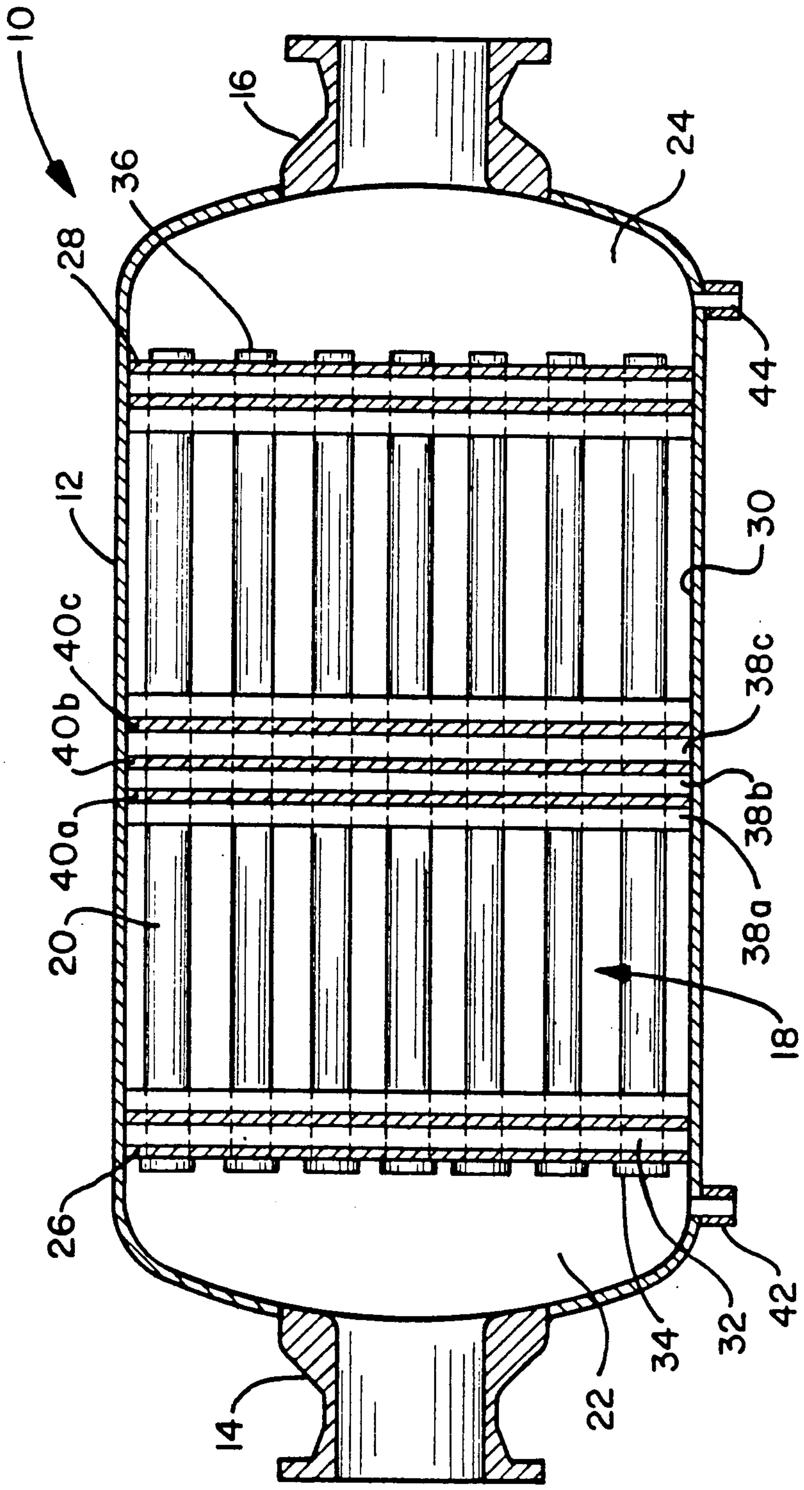
FIG. 1 is a side elevation view, in section, of a magnet filter in accordance with one embodiment of the invention.
Figure 2:
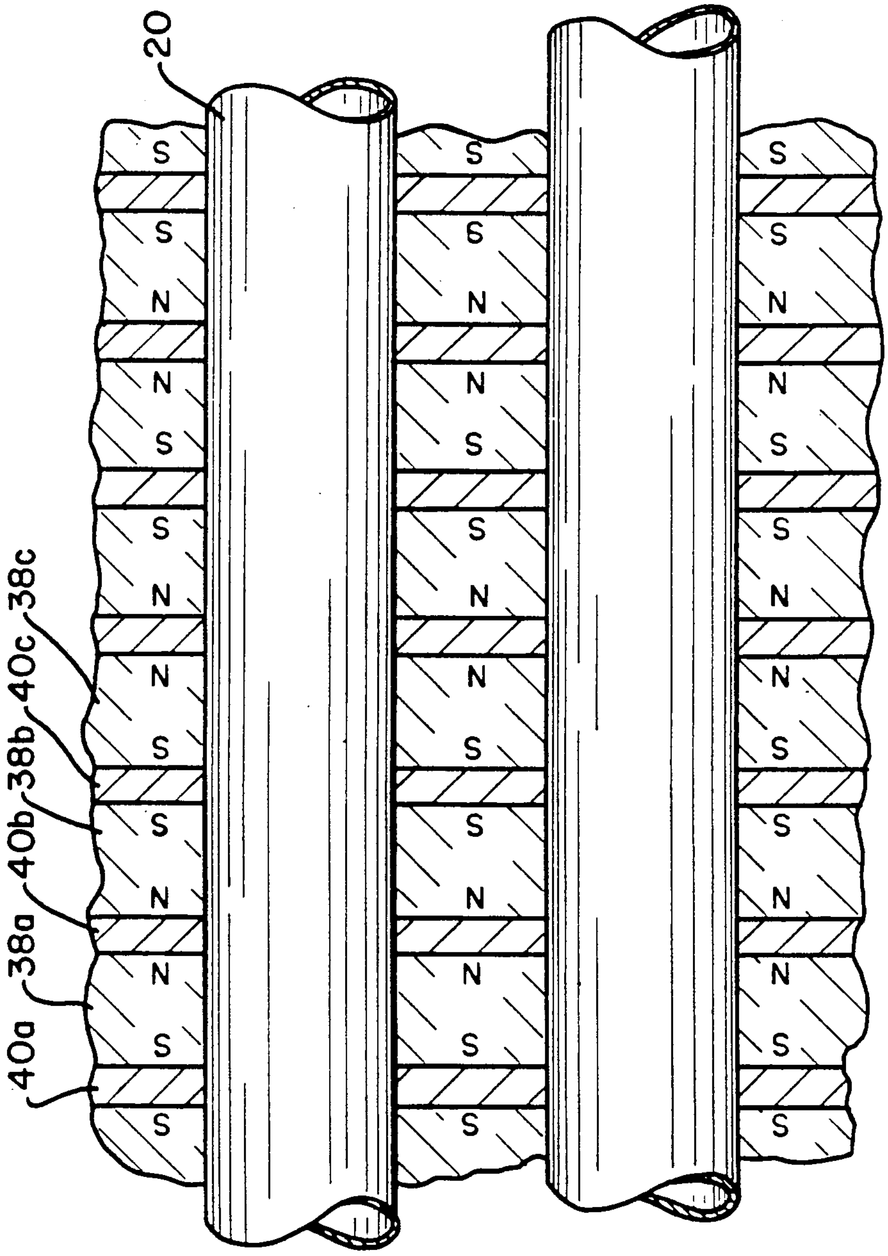
FIG. 2 is an enlarged, detailed view of a portion of the filtering region of the embodiment shown in FIG. 1.

FIGS. 1 and 2 illustrates a first embodiment 10 of the invention, in the form of a horizontally oriented magnet filter having a substantially closed vessel 12 to which has been attached an inlet nozzle 14 and outlet nozzle 16. A filtering region 18 is defined within the vessel, by a plurality of non-magnetic metal tubes 20, such as stainless steel, of substantially the same length, extending in spaced-apart, parallel relation from adjacent the inlet plenum 22 to adjacent the outlet plenum 24. These tubes are supported in a stationary position within the vessel, by one or more end plates 26, 28 which are permanently or detachably secured to the vessel inner wall 30.

The upstream ends 32 of the tubes 20 are typically spaced somewhat from the nozzle, thereby defining an inlet plenum region 22 into which the fluid to be filtered flows from the inlet nozzle 14. The upstream plate 26 is preferably in the form of a disk having a plurality of holes, each with an inner diameter substantially equal to the tube outer diameter. The upstream ends 32 of the tubes 20 have enlarged structure, such as flanges 34, located in the plenum and in overlapped contact with the solid portion of the support plate, such that the tube cannot move in the downstream direction as the result of flow from the inlet to the outlet nozzle.

The downstream end 36 of each tube need not have any special structure associated therewith, because reverse flow through the vessel would not normally be expected.

The magnetic field within the tubes 20 is established by a plurality of substantially disk-shaped magnet plates 38*a,b,c* . . . and a plurality of disk-shaped pole plates 40*a,b,c* . . . oriented transversely to the tubes 20 such that all the tubes pass through all the plates 38,40. The plates are alternated over substantially the full length of the tubes. Each pole plate 40 is formed from the material having a high susceptibility to magnetization, such as carbon steel. Each magnet plate 38 has a north pole side and a south pole side, with the magnet plates oriented so that substantially each pole plate 40 is sandwiched between two magnet plate 38 sides of the same polarity. Of course, the strongest magnetic fields within the tubes are produced when the pole and magnet plates are sandwiched together over the full length of the tubes, in a tightly packed manner as represented in FIG. 2.

Figure 13:
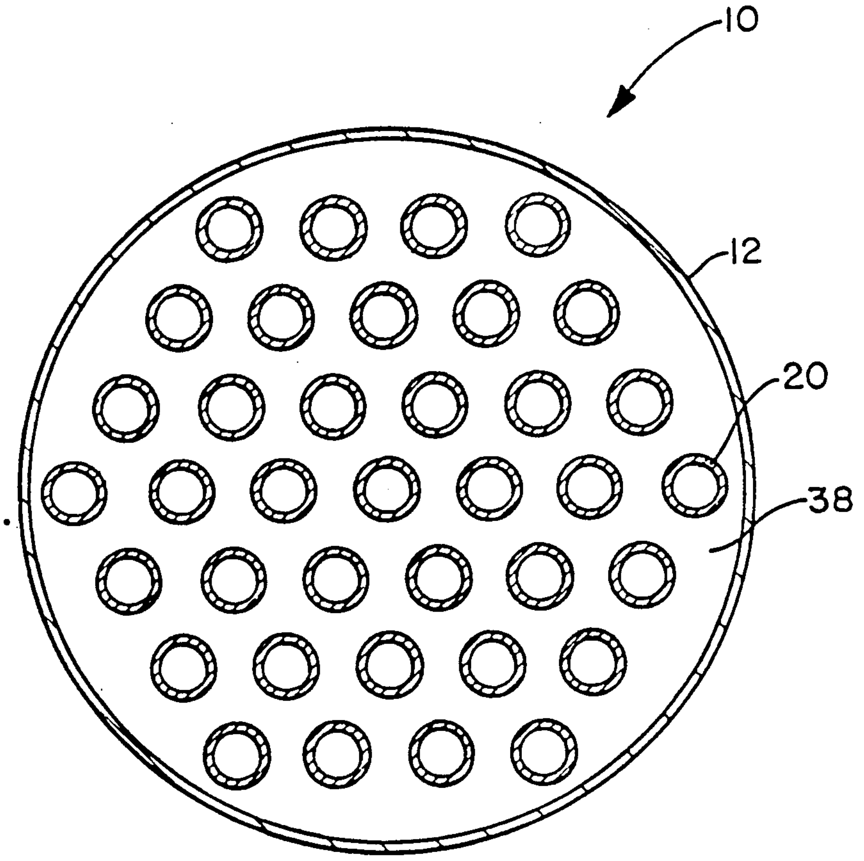
FIG. 13 is a section view of the magnet filter shown in FIG. 1, taken along line 13—13.

As shown in FIG. 13, the most dense packing array for the tubes 20 as viewed in cross-section through the vessel 12, is on a triangular pitch. The pitch is defined by the centers of the multiplicity of drilled holes on the regular, triangularly pitched pattern in the end plates 26,28 pole and magnet plates 40,38. Preferably, the vessel 12 is cylindrical, the plates 26,28,38,40 are in the form of circular disks, and the overall pattern of the tubes, when viewed in section through the vessel, is substantially circular.

The upstream end plate 26 can be in the form of a pole plate, as can the downstream end plate 28. Although it is preferred that at least the upstream and downstream end plates 26,28 be attached to the vessel wall 30, this is not absolutely necessary so long as some structure is provided for preventing the plates and tubes from shifting longitudinally within the vessel, or from becoming imbalanced, i.e. tilting from the orthogonally transverse orientation shown in FIG. 1.

The packing of the pole plates 40 and magnet plates 38 produces an intense magnetic field within each tube 20 such that magnetizable particles in the fluid passing through the tubes from the inlet plenum 22 to the outlet plenum 24, adhere to the inside surface of each tube. In normal operation, the fluid flow velocity is in the preferred range of 2 to 5 feet per second. The dense packing of the pole plates and the magnet plates within the filtering region 18 precludes any significant flow through the region, except through the open, upstream ends of the tubes 20. Nevertheless, the flanged upstream ends 34 of the tubes may desirably be welded or otherwise sealed to the respective upstream end plate 26 to prevent any leakage flow between the tubes.

With a vessel mounted in a plant in the horizontal orientation shown in FIG. 1, at least two drain ports 42,44 may desirably be provided in fluid communication with the respective inlet and outlet plena 22,24.

Figure 3:
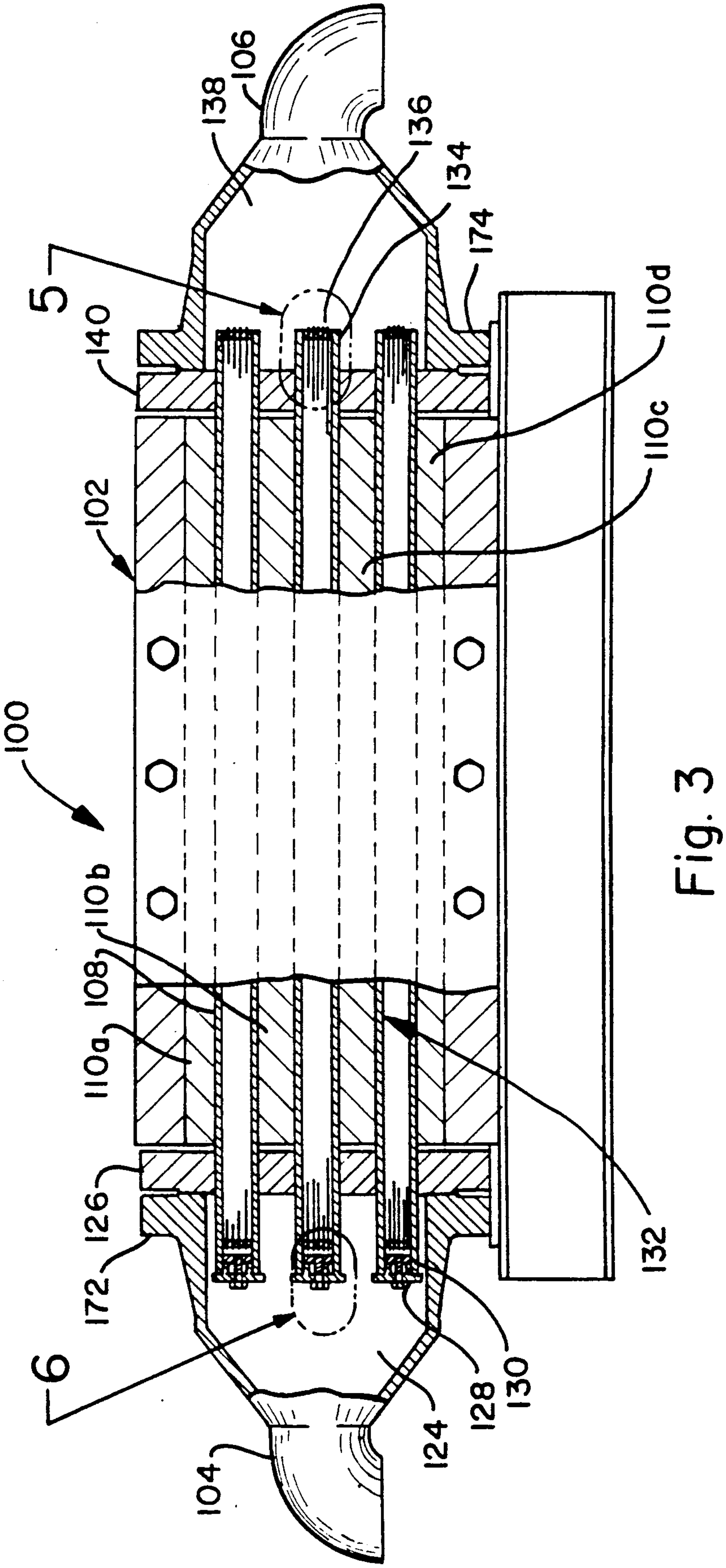
FIG. 3 is a side elevation view, partly in section, of a second embodiment of the invention.
Figure 4:
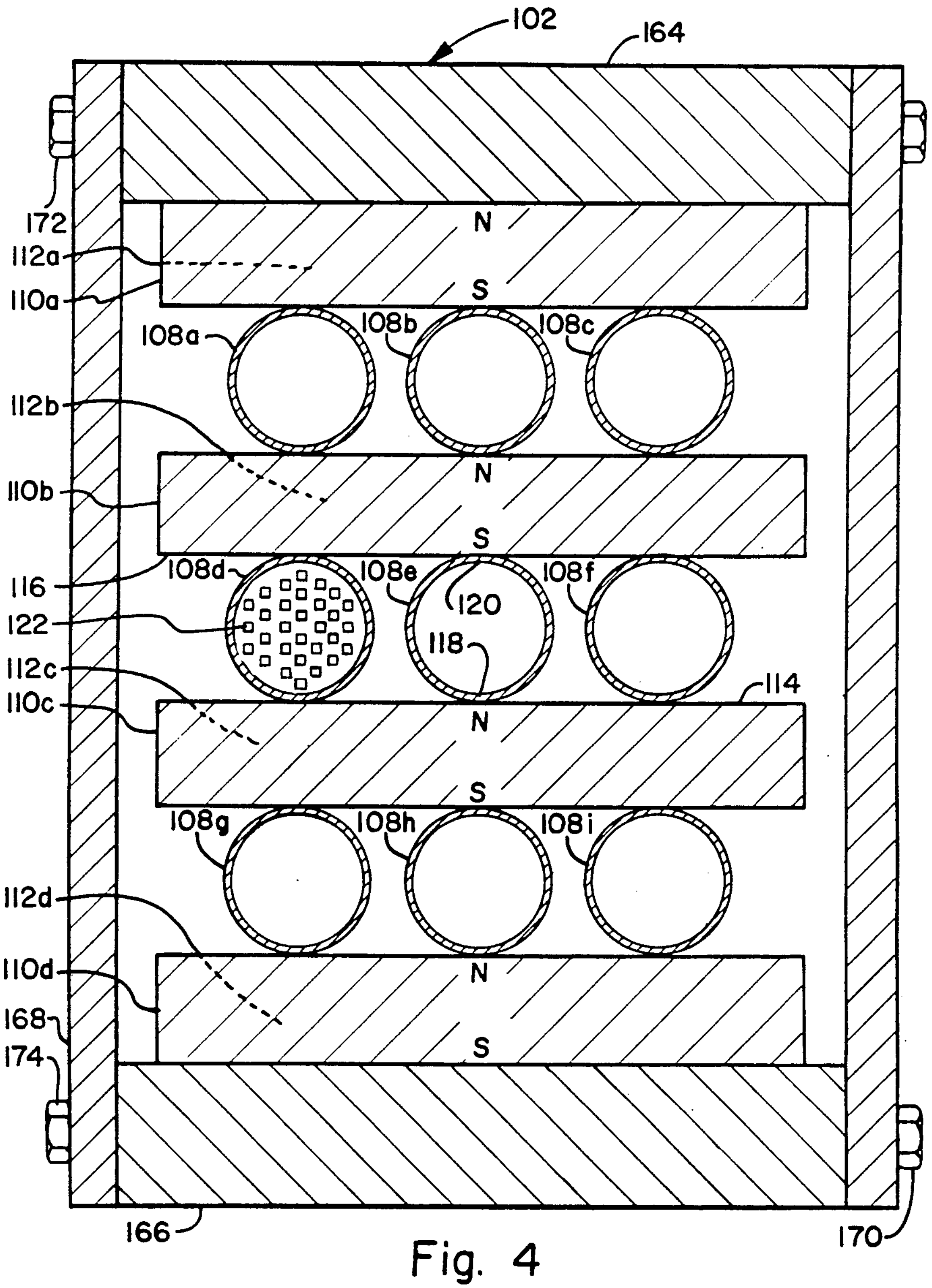
FIG. 4 is a section view taken through line 4—4 of FIG. 3.

FIGS. 3–10 show a second embodiment 100 of the invention which desirably has a modular construction. A substantially closed vessel 102 or chamber has a fluid inlet 104 and a fluid outlet 106 situated generally at opposite ends of a longitudinal axis. A plurality of non-magnetic, metal tubes 108, are supported within the vessel in an ordered array having a recurring sequence of spaces between recurring groups of tubes. For example, as shown in FIG. 4, the tubes 108 *a,b,c,d,e,f,g,h,i* are on a rectangular array, in which the centers of tubes adjacent to a given tube 108*e*, are in vertical or horizontal alignment. In the illustrated embodiment, the vertical pitch between tubes 108 *b,e,h* is greater than the horizontal pitch between tubes 108 *d,e,f.* Thus, the tubes 108 *a,b,c;* 108 *d,e,f;* and 108 *g,h,i* may be considered as being in an array of three groups of horizontally side-by-side tubes with the groups vertically spaced from other, i.e., vertically recurring groups of horizontally side-by-side tubes.

As shown in FIG. 4, a plurality of permanent magnet plates 110*a,b,c,d* are supported in the recurring spaces 112*a,b,c,d,* respectively. Alternatively, the permanent magnets could be located vertically in the spaces between columns of tubes, but the arrangement shown in FIG. 4 better takes advantage of gravitational effects. Each magnet plate 110 preferably spans substantially the full longitudinal length of the tubes 108 as shown in FIG. 3. Each magnet plate 110 has an upper 114 and a lower 116 surface, preferably in contact with respective lower 118 and upper 120 portions of the tubes in adjacent rows. The polarity of the upper 114 and lower 116 surfaces of the magnetic plates 110 that contact the same tubes, should be different, for the reason that this maximizes the intensity of the magnetic fields between the plates 110 and thus through the tubes 108. The magnets are oriented such that the south face of the upper magnet is in contact with the tube and the north face of the lower magnet touches the tube or visa-versa. With this arrangement, the magnetic force is perpendicular to the tube and the flowing fluid.

Each of the tubes contains a plurality of magnetic, metal bars 122 supported in spaced-apart relation within the tube. The intense magnetic field magnetizes these bars 122 and the preferred, square configuration thereof, provides several edges in which the field is locally intensified even further.

In general, the inlet fluid to be filtered enters the inlet plenum 124 and confronts the upstream tube sheet 126 which blocks further flow through the open front of chamber 102. The upstream end 128 of each tube 108 includes one or more openings 130 for directing the inlet fluid from the inlet plenum 124 into the respective tubes. Thus, fluid flow through the filtering section 132 is only within the tubes 108. As the fluid passes through the tubes along the magnetized surfaces of the bars 122, magnetizable particles are extracted from the fluid and adhere to the bars. Openings 134 or the like are provided at each downstream end 136 of the tubes, for directing filtered fluid into the outlet plenum 138, from which it can be returned to the industrial process. Downstream tube sheet 140 prevents backflow into filtering region 132.

The downstream end of each tube can be quite straightforward, and consist of an end cap 142 serving as a closure and as a retainer plate for the plurality of bars 122. Immediately upstream of the end plate, a plurality of radial holes 134 are provided in the wall of the tube 108, through which the filtered fluid flows out of the tube into the outlet plenum 138.

The upstream end 128 of each tube 108 is preferably somewhat more complex, because several objectives must be accomplished. First, it is desirable that the orientation of the bars 122 within the tube be initially established and maintained so that two sides are horizontal and two sides are vertical. One of the closures, preferably upstream, should be removable so that the bars can be withdrawn from the tube and cleaned, or at least made accessible for cleaning. Vibration of the bars could reduce the bar effectiveness in collecting and retaining corrosion products.

Figure 5:
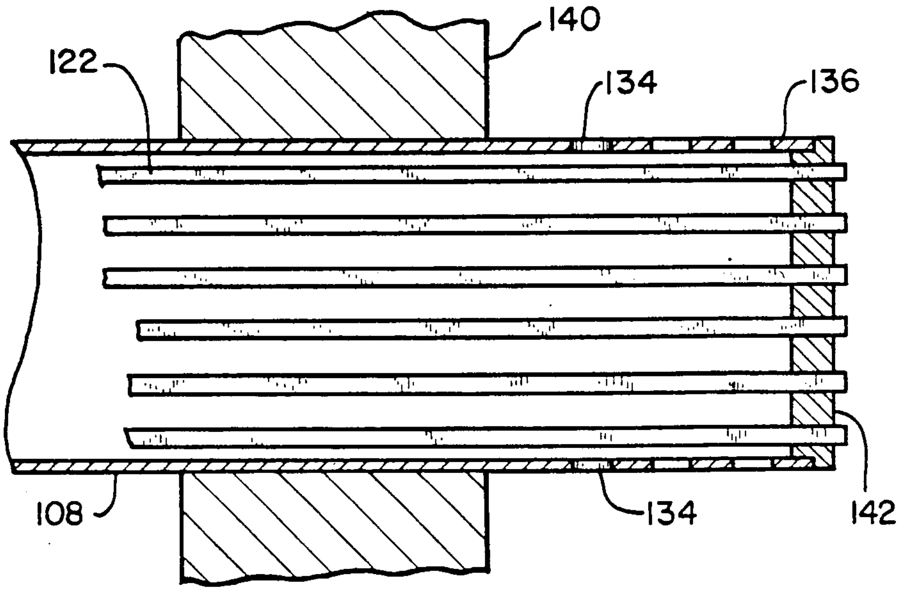
FIG. 5 is an enlarged view of the outlet portion of a filter tube as indicated at 5 in FIG. 3.
Figure 6:
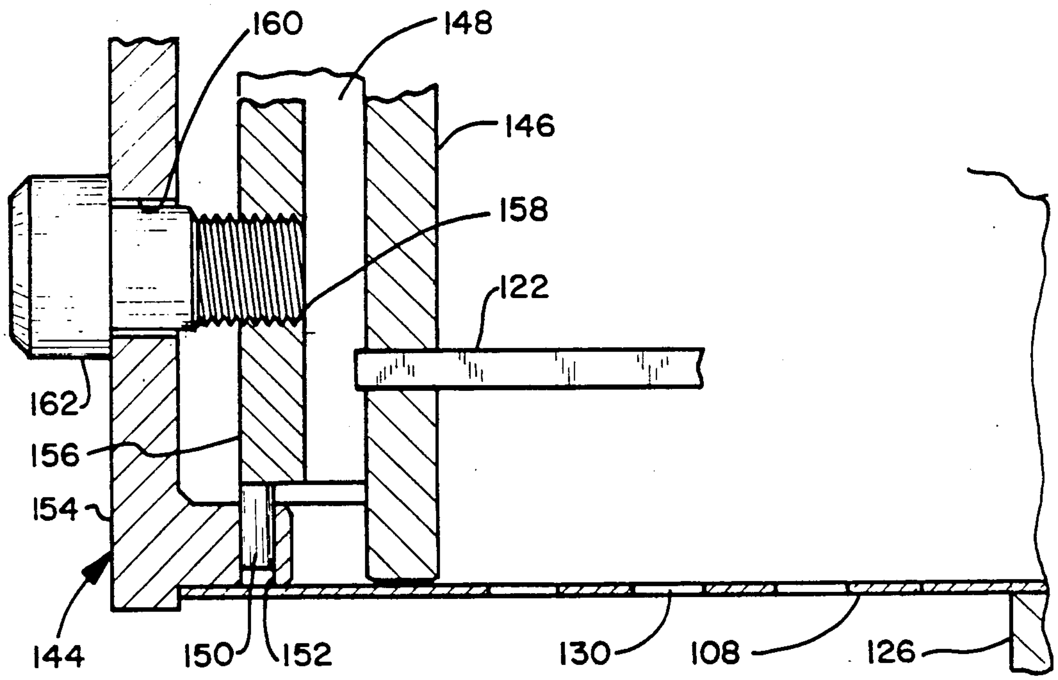
FIG. 6 is a detailed view of the inlet portion of a filter tube as shown at 6 in FIG. 3.

These objectives are accomplished in the preferred embodiment shown in FIG. 6, where the upstream portion of the tube 108 contains a plurality of radial openings 130 through which the fluid enters the tube, upstream of the tube sheet 126, but the closure member 144 has several components. The upstream end plate 146 to which each bar 122 is rigidly attached, is somewhat similar to the downstream end plate 142 shown in FIG. 5, except that it does not serve as a closure per se. Rather, a substantially cylindrical neck 148 projects in the upstream direction from the end plate 142, and has a diameter less than the diameter of the tube. At least one alignment pin 150 projects radially from the circumference of the neck 148 to serve as a key engaging a keyway 152 to the closure cap, and thereby assuring proper alignment of the bars 122 relative to some indicia that may be carried on the tube or closure cap. The neck 148 further includes a rigidly connected cover 156 having a threaded opening 158 coaxial with the tube axis and central bore 160 on the closure cap 154. This arrangement accommodates a lag bolt 162 which passes freely through the closure cap 154 but threadably engages the cover 156. Advancing the bolt 162 unifies the structure within the tube, by pulling the upstream closure cap 154 and the downstream end plate 142 closer together, against the upstream and downstream cylindrical edges, respectively, of the tube 108. It should be appreciated that the closure of the upstream and downstream ends of the tubes need not be perfectly sealed, because any such flow would, in effect, follow the same flow as the desired flow passing through the upstream and downstream flow holes 130,134.

As shown in FIGS. 3 and 4, the vessel or chamber 102 can easily be formed from commonly available components such as rectangular plates 164,166,168,170 that can easily be drilled. The external housing is preferably an elongated, rectangular open-ended box formed by four orthogonally joined, rectangular housing plates, by means of bolts 172,174 or the like. The upstream and downstream tube sheets 126,140 can be independent of the box structure, since a bolt connection can be made to the flanges 172,174 of the upstream and downstream nozzles 104,106, and sealing can be implemented therebetween by a conventional gasket. Thus, the filtering action occurs within the tubes 110 in the box 102 containing the magnets 110, whereas the flow distribution is controlled in the inlet and outlet plena 124,138.

It should be appreciated that the box-like construction provides a natural, enveloping support to the plate-like magnets 110, as shown in FIG. 4. Preferably, at least two of the housing plates, e.g., 168,170, restrain the magnets from movement out of the tube array beyond a displacement limit. Thus, in FIG. 4, the upper and lower magnet plates 110*a*,110*d* are in contact with respective housing structure 164,166 and a plurality of adjacent tubes. The widths of the plates 110 can be selected to be approximately equal to dimension between side plates 168,170 of the housing, although this dimension is not critical. It should be appreciated, however, that the cold dimension should be selected to account for any differential expansion effects at operating conditions. It should further be appreciated that the box structure need not be fluid-tight, if the tubes are fluid sealed against the tube sheets because flow is through the tubes 108 only.

FIGS. 7-10 illustrate the preferred way of supporting the bars 122 over the full lengths of the tubes 108, between the end plates 142,146 shown in FIGS. 5 and 6. At a plurality of locations along the lengths of the bars, selected on the basis of minimizing vibration at the anticipated flow rates through the tubes, a respective plurality of grids 172 resembling an egg crate are welded to the bars 122. As viewed in FIG. 7, each grid comprises a plurality of vertically and horizontally interengaged, plate-like members 174,176, typically two vertically spaced-apart members, and, for example, seven cross members. The bars 122 are welded on the upper surface, in spaced-apart lateral relation, on each of the horizontal cross members 176.

Figure 9:
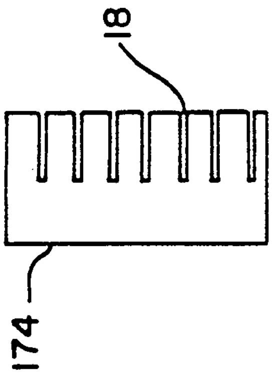
FIG. 9 is a elevation view of the vertical components of the grid member shown in FIG. 8.
Figure 10:
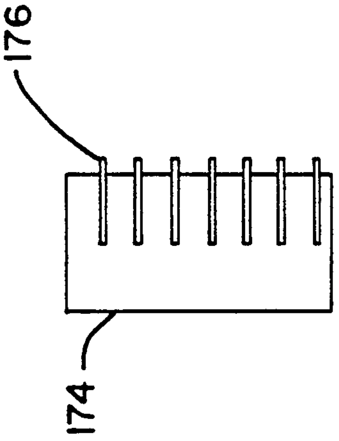
FIG. 10 is a side view of the grid member shown in FIG. 8.
Figure 8:
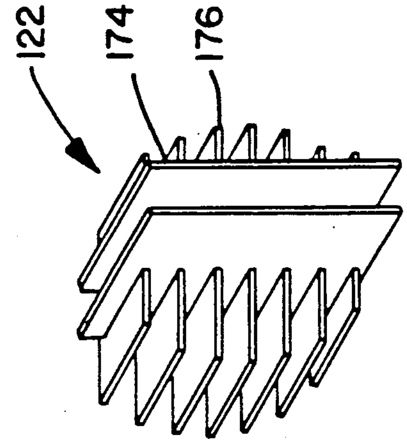
FIG. 8 is a perspective view of the preferred form of the grid member shown in FIG. 7.
Figure 7:
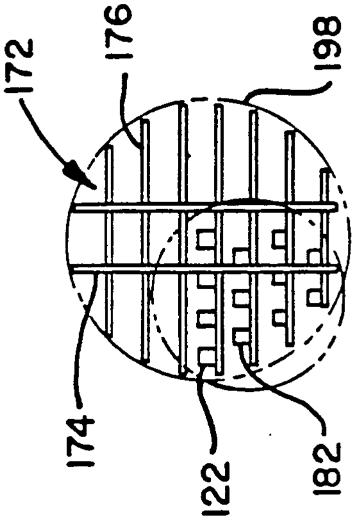
FIG. 7 is a front elevation view of bar assembly for insertion within a tube, showing the grid member and associated bars to which the filtered particulates adhere.

FIG. 8 shows one such grid structure 172 in perspective. FIG. 9 is a side view of one of the vertical plates 174, and FIG. 10 is a similar side view showing the horizontal plates 176 inserted into the vertically spaced, horizontal slits 180 in the vertical plate 174. Each of the horizontal plates 176 is thus substantially solid, and, as shown in FIGS. 7 and 8, interengages both of the vertical plates 174. The horizontal plates 176 preferably have a variety of widths, so that the grid, when viewed as in FIG. 7, has a cross-sectional perimeter 178 substantially equal to the tube casing inner circumference.

Typically, the square bars 122 are, for example, Type 430 Stainless Steel. The corrosion products will tend to collect on the corners 182 of the bars. The bars are positioned so that the top and bottom flat surfaces of the bars 122 are parallel to the flat surfaces of the magnets.

Figure 11:
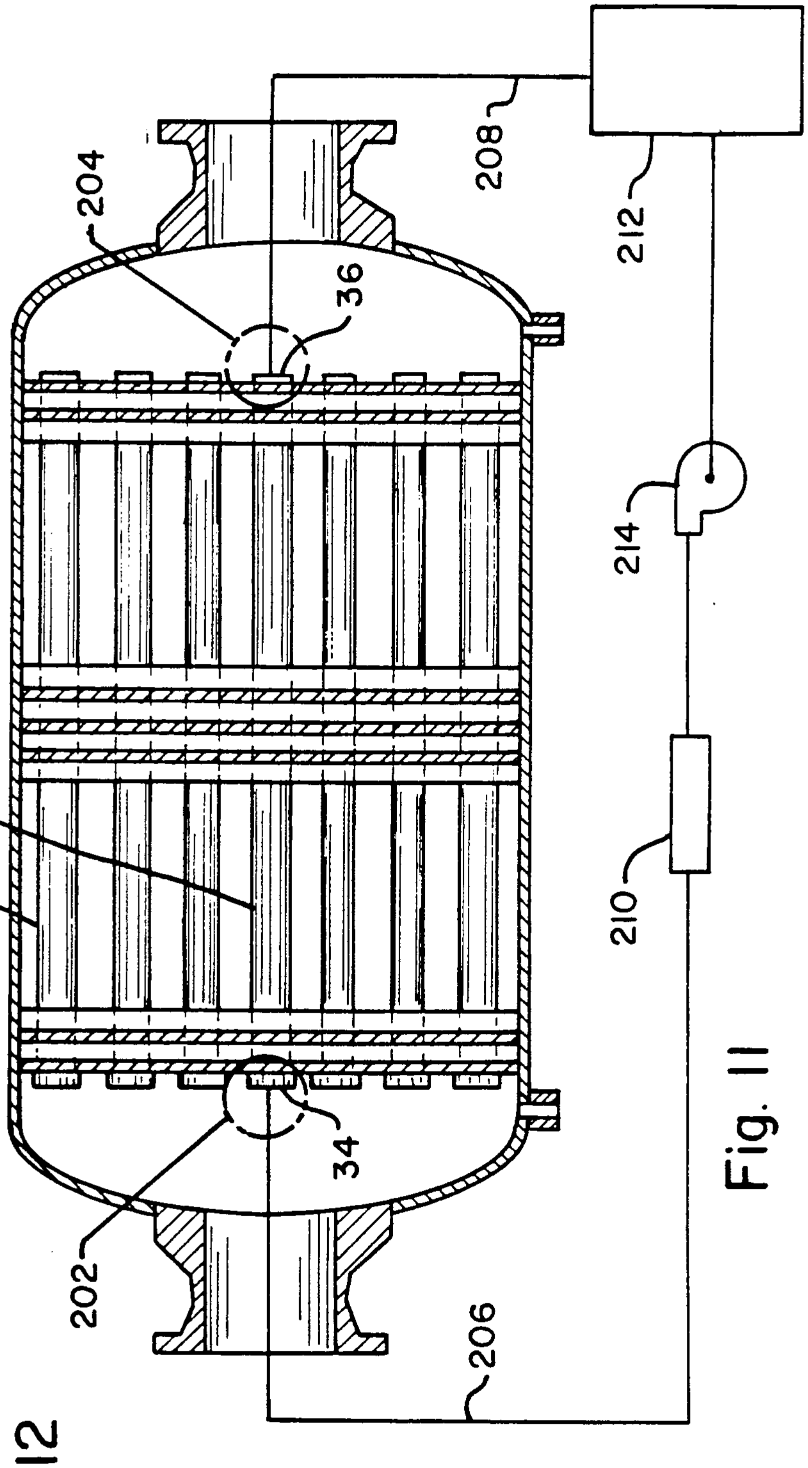
FIG. 11 is a schematic representation of the auxiliary system associated with the invention, for cleaning the corrosion products in the filter.
Figure 12:
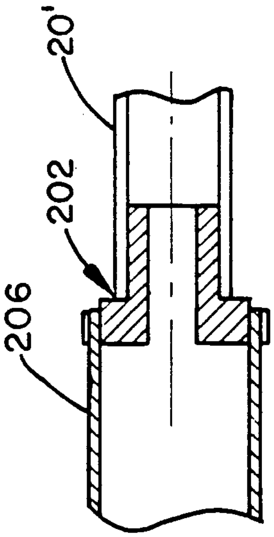
FIG. 12 is a detail view of the nozzle associated with the auxilliary cleaning system of FIG. 11.

FIGS. 11 and 12 schematically show an auxiliary system for cleaning the filter tubes 20 of the filter embodiment shown in FIG. 1. A cleaning nozzle 202 that can pass through either the vessel inlet nozzle 14 or through some other access opening (not shown) is manually or remotely positioned over the upstream end or flange 34 of an individual tube 20', and a collection nozzle 204 is similarly attached to the downstream end 36 of the same tube. The nozzles 202,204 can be secured to somewhat flexible lines 206,208. The source line 206 provides clean water from tank 212 via filter 210 and the discharge line 208 is fluidly connected to the tank 212. A pump 214 or other source of pressurization forces a cleaning flow through the cleaning nozzle 202, the respectively connected tube 20', and out the discharge nozzle 204, with a flow rate that is greater than, preferably by a factor of three or four, the normal filtering flow rate through the tube. This higher flow rate dislodges the corrosion products, despite the continued presence of the magnetic field, and, in effect flushes them into the collection filter 210. The collection filter may have a drain port or fluid connection to a subsequent recovery system (not shown). Preferably, at least the nozzles 202,204, pump 214, lines 206,210, and collection tank 212 are carried on a slab or the like that can be positioned near the filter unit 10 during a plant outage.

It should be appreciated that with the embodiment shown in FIG. 11, the nozzles 202,204 could, for example, be conical or of different shape for insertion into the respective ends of the tubes. Nozzles of the type shown in FIG. 11 can be used with the filter embodiment of either FIG. 1 or FIG. 3, but are especially useful where some type of external seal around the upstream and downstream ends of the tubes are needed, due to the presence of the grids and magnetic bars within the tubes.

What is claimed is:

1. A permanent magnet filter comprising:

a closed vessel having a fluid inlet at one end and a fluid outlet at the other end;

a plurality of nonmagnetic metal tubes of substantially the same length located within the vessel and extending in spaced apart, parallel relation from adjacent the inlet to adjacent the outlet;

means for supporting the tubes in a stationary position within the vessel;

means associated with the tubes for directing fluid from the inlet into the tubes;

a plurality of magnet plates and pole plates oriented transversely to the tubes such that all the tubes pass through all the plates, the plates being alternated over substantially the full lengths of the tubes;

each pole plate being formed from a material having a high susceptibility to magnetization;

each magnet plate having a north pole side and a south pole side, the magnet plates being oriented so that substantially each pole plate is sandwiched between two magnet plate sides of the same polarity;

whereby an intense magnetic field is produced within each tube such that magnetizable particulates in the fluid adhere to the inside surface of each tube.

2. The magnet filter of claim 1, wherein each magnet plate is a permanent magnet.

3. The magnet filter of claim 1, wherein each tube is made from stainless steel and each pole plate is made from carbon steel.

4. The magnet filter of claim 1, further including means for pumping a flow of liquid through the vessel such that the flow rate through each tube is in the range of about 2 to 5 feet per second.

5. The magnet filter of claim 1, wherein the tubes are supported in an array having a triangular pitch when viewed in cross section.

6. The magnet filter of claim 1, wherein the means for supporting the tubes includes the pole plate closest to the inlet, said closest pole plate being rigidly supported by the vessel.

7. The magnet filter of claim 6, wherein the end of each tube closest to the inlet, includes flange means for interacting with said closest pole plate, to prevent the tube from moving toward the outlet, while permitting movement toward the inlet.

8. The magnet filter of claim 1, wherein the vessel is substantially cylindrical, the tubes form a substantially circular array when viewed in section, and each magnet plate and pole plate is a substantially circular disk having a diameter at least equal to the diameter of the tube array.

9. The magnet filter of claim 8, wherein each magnet plate and pole plate is a unitary member having a plurality of holes drilled therethrough for the passage of a respective plurality of tubes.

10. A magnet filter comprising:

a substantially closed vessel having longitudinal ends including a fluid inlet at one end and a fluid outlet at the other end;

a plurality of nonmagnetic, metal tubes supported within the vessel in an ordered array of rows and columns, each tube oriented longitudinally in the same direction as the vessel, the rows of tubes being spaced apart in a first direction transverse to the tube orientation and the columns spaced apart in a second direction perpendicular to the first direction and to the tube orientation, the spaces between the rows being larger than the spaces between the columns;

a plurality of permanent magnets in the form of plates oriented longitudinally with the tubes and located in the spaces between adjacent rows of tubes;

a plurality of magnetic metal bars supported longitudinally in spaced apart relation within each tube;

means associated with each tube near the fluid inlet, for directing fluid from the fluid inlet into one end of each tube; and means associated with each tube near the fluid outlet, for directing fluid out of each tube into the fluid outlet.

11. The magnet filter of claim 10, wherein each magnet plate has an upper and a lower surface in contact with respective lower and upper portions of the tubes in adjacent rows.

12. The magnet filter of claim 11, wherein the polarities of the upper and lower surfaces of respective lower and upper magnet plates that contact the same tubes, are opposite.

13. A magnet filter comprising:

a substantially closed housing defining a vessel having a fluid inlet and a fluid outlet;

a plurality of nonmagnetic, metal tubes supported in spaced apart relation within the vessel;

a plurality of permanent magnets supported between the tubes;

a plurality of magnetic, metal bars supported longitudinally in spaced apart relation within each tube;

means associated with each tube near the fluid inlet, for directing fluid from the fluid inlet into one end of each tube;

means associated with each tube near the fluid outlet, for directing fluid out of each tube into the fluid outlet;

wherein the housing is an elongated, rectangular box formed by four orthogonally joined, rectangular housing plates;

wherein the tubes are supported in a rectangular array of rows and columns having a longitudinal dimension parallel to that of the housing; and wherein the magnets are in the form of elongated plates located between either the rows or columns of the array and in contact with the tubes in the respectively adjacent rows or columns.

14. The magnet filter of claim 13, wherein at least two of the housing plates restrain the magnets from movement out of the tube array beyond a displacement limit.

15. A magnet filter comprising:

a substantially closed elongated vessel formed by a plurality of joined wall segments and having a fluid inlet plenum at one longitudinal end and a fluid outlet plenum at the other longitudinal end;

upstream and downstream nozzles secured to the inlet and outlet plena of the vessel, respectively;

upstream and downstream tube sheets situated at the fluid inlet and fluid outlet plena, respectively;

a plurality of nonmagnetic, metal tubes supported by the tube sheets within the vessel in an ordered array having a recurring sequence of spaces between a recurring group of tubes;

a plurality of permanent magnets supported in said recurring spaces, respectively;

means associated with each tube near the fluid inlet, for directing fluid from the fluid inlet plenum into one end of each tube;

means associated with each tube near the fluid outlet plenum, for directing fluid out of the tube into the outlet plenum;

wherein each tube includes a cylindrical casing having a longitudinal axis and first and second ends, a bar assembly slidingly contained within the casing, the bar assembly including a plurality of axially spaced apart grid members having a cross sectional perimeter substantially equal to the casing inner circumference, a plurality of magnetic metal bars being attached to said grid members and extending longitudinally in spaced apart relation within the casing for a distance less than the length of the casing, and first and second cap means for closing the first and second ends of the casing.

16. The magnet filter of claim 15, including means interposed between at least one of said end cap means and the closest grid member to said one end cap means, for maintaining the grid member in a preselected fixed rotational orientation relative to the casing axis.

17. The magnet filter of claim 15, wherein the means for directing fluid includes a plurality of radial holes through the casing near the first and second ends of each tube.

18. The magnet filter of claim 15, wherein at least one of the cap means on each tube is rigidly connected to said bars, and wherein means are provided at the other end of the tube for drawing said one cap means toward the tube other end, whereby said one end cap means is sealingly secured to said one end of the casing.

19. A magnet filter comprising enclosure means containing a plurality of elongated, nonmagnetic tubes in a regular, spaced apart array in which every tube is spaced apart from at least one adjacent tube, each tube having an upstream and a downstream end;

a plurality of discrete permanent magnet bodies interspersed among the tubes, each tube being in contact with at least two of said magnetic bodies, and each body being situated in at least one of said spaces between a tube and an adjacent tube in said array, for imposing a magnetic field within each tube over substantially the full length of each tube;

means for introducing a fluid to be magnetically filtered into the upstream end of each tube; and means for extracting filtered fluid from the downstream end of each tube;

and wherein the magnet bodies are substantially flat, rectangular plates oriented parallel to a longitudinal axis of said tubes, with the magnetic fields within the tubes oriented predominantly transverse to the tube longitudinal axis.

20. The magnet filter of claim 19, further including a plurality of spaced apart, magnetic bars situated longitudinally within each tube in the path of fluid flowing from the upstream to the downstream ends of the tubes, said bars providing deposit sites for the particulates filtered from the fluid.

21. The magnet filter of claim 20, further including at least one grid member situated within the tube, for supporting the bars in the spaced apart relation intermediate the tube ends.

22. A magnet filter comprising: enclosure means containing a plurality of elongated, nonmagnetic tubes in a regular, spaced apart array in which every tube is spaced apart from at least one adjacent tube, each tube having an upstream and a downstream end; a plurality of discrete permanent magnet bodies interspersed among the tubes, each tube being in contact with at least two of said magnetic bodies, and each body being situated in at least one of said spaces between a tube and an adjacent tube in said array, for imposing a magnetic filed within each tube over substantially the full length of each tube; means for introducing a fluid to be magnetically filtered into the upstream end of each tube; and means for extracting filtered fluid from the downstream end of each tube; and further including a plurality of spaced apart, magnetic bars situated longitudinally within each tube in the path of fluid flowing from the upstream to the downstream ends of the tubes, said bars providing deposit sites for the particulates filtered from the fluid.

23. The magnet filter of claim 22, further including at least one grid member situated within the tube, for supporting the bars in the spaced apart relation intermediate the tube ends.

* * * * *